Patented Feb. 19, 1935

1,991,391

UNITED STATES PATENT OFFICE 1,991,391

ESTER OF POLYCARBOXYLIC ACIDS

Emmette F. Izard, Elsmere, Del., assignor to E. I. du Pont de Nemours & Company, Wilmington, Del., a corporation of Delaware No Drawing. Application July 11, 1931, Serial No. 550,286

26 Claims. (Cl. 260—106)

This invention relates to esters of polycarboxylic acids, and more particularly, to dicarboxylic acid esters of monohydric ether alcohols in which the acid is a saturated or unsaturated aliphatic dicarboxylic acid containing from 6–10 carbon atoms, inclusive. The invention also relates to a method of preparing these esters, and to cellulose derivative compositions containing these esters as plasticizers.

An object of the invention is to provide an economical and practical method of preparing dicarboxylic acid esters of monohydric ether alcohols. A further object is to provide new esters of this type having valuable properties. A further object is to provide cellulose derivative compositions of improved water resistance and durability employing these esters as plasticizers therein. Other objects of the invention will be apparent from the description hereinafter given.

The above objects are accomplished according to the present invention by reacting a saturated or unsaturated dicarboxylic acid containing 6–10 carbon atoms, inclusive, with a monohydric ether alcohol in the presence of a catalyst at an elevated temperature, and removing the water formed by said reaction from the reaction zone. Alternatively, the esters may be prepared by reacting an ester of an acid of the group specified with a monohydric ether alcohol having a higher boiling point than the alcohol formed upon hydrolysis of the ester used as the starting material. The use of a catalyst is not essential, although it is preferred.

Sulphuric acid, metallic sodium, hydrogen chloride gas, or phenol sulphonic acid, and the like, may be used as catalysts in the reaction. The temperature may be varied widely, but it is preferred to keep it between 80–200° C. If desired, an inert, high boiling solvent, such as toluol, may be used in the reaction mixture to facilitate the removal of the water formed during the reaction, or the alcohol formed during the reaction where an ester is used as the starting material.

The following examples are given to illustrate the preparation of esters according to the present invention:

Example 1. Di-ethoxyethyl adipate.—A mixture of 1800 grams of adipic acid, 2500 grams of ethoxyethanol, 1000 grams of toluol, and 45 grams of sulphuric acid was heated to boiling in an apparatus designed to separate the water from the distillate and return the organic solvent to the reaction vessel. After 6 hours' heating, it was found that approximately 95% of the adipic acid had been esterified. The product was treated with potassium carbonate to remove the excess acid and then purified by vacuum distillation. Di-ethoxyethyl adipate distills between 200–220° C. at 10 mm. pressure.

By the use of methyl adipic acid in place of adipic acid, the corresponding esters of methyl adipic acid may be obtained in the manner above described. By reacting butoxyethanol with methyl adipic acid, the di-butoxyethyl ester of methyl adipic acid is obtained.

Example 2. Di-diethylin sebacate.—A mixture containing 202 grams sebacic acid, 306 grams di-ethylin, 100 grams toluol, and 4 grams sulphuric acid was heated to boiling in an apparatus such as used in Example 1. Esterification was practically complete in 3 hours. The product was then purified as in Example 1. Di-diethylin sebacate distills between 260–265° C. at 2 mm. pressure.

Example 3. Butoxyethyl ethyl sebacate.—118 parts of butoxyethanol containing 0.5 parts of dissolved sodium was added to 258 parts diethyl sebacate. The mixture was heated to boiling under a fractionating column until 42 parts of ethanol had distilled out. The product was washed with water, and then purified by heating to 180° C. at 15 mm. pressure in the presence of decolorizing carbon. The filtered product was an amber colored liquid.

The above example illustrates the preparation of these esters using an ester of a dicarboxylic acid as the starting material. Any other simple ester of a dicarboxylic acid could be substituted for the ethyl ester in the above example. Likewise, any other ether alcohol can be substituted for the butoxyethanol, provided the alcohol has a higher boiling point than the alcohol formed upon hydrolysis of the dicarboxylic acid ester used as the starting material.

Example 4. Di-ethoxyethoxyethyl adipate.— A mixture containing 150 grams of adipic acid and 325 grams of ethoxyethoxyethanol was heated to boiling for 8 hours while passing a slow stream of dry hydrogen chloride gas through the reaction mixture. The product was washed with alkali to remove the unreacted acid and then vacuum distilled. Di-ethoxyethoxyethyl adipate distills between 250–300° C. at 6 mm. pressure.

Example 5. Di-butoxyethyl sebacate.—A mixture containing 202 grams sebacic acid, 350 grams butoxyethanol, 100 grams toluol and 4 grams sulfuric acid was heated to boiling in an apparatus such as used in Example 1. Esterification was practically complete in three hours. The product was purified as in Example 1. Butoxyethyl sebacate distills between 240-250° C. at 2 mm. pressure.

The esters coming within the scope of the present invention include the esters of the saturated aliphatic dicarboxylic acids having from 6-10 carbon atoms, inclusive, such as adipic, methyl adipic, dimethyl adipic, pimelic, suberic, azelaic, and sebacic acids, and the esters of the unsaturated adiphatic dicarboxylic acids having from 6-10 carbon atoms, inclusive, such as dihydromuconic, muconic, diacetylenedicarboxylic, dipropargyldicarboxylic piperylenedicarboxylic, zeronic, and tetraacetylenedicarboxylic acids. With some of those containing triple bonds, care must be exercised in the preparation due to the instability of the free acids. Halogenated acids, particularly chlorinated acids, may be used. These acids may be esterified with a monohydric ether alcohol represented by the formula:— R—O—R'—OH, in which R represents a monovalent organic radical containing more than one carbon atom, and R' represents a divalent organic radical. The esters formed from the ether alcohols represented by the formula:— R—O—CH2CH2OH, i. e., the ether ethanols, are particularly valuable. Besides the monohydric ether alcohols described in the specific examples butoxyethoxyethanol, benzyloxyethanol, cyclohexyloxyethanol, lauroxyethanol, tetrahydrofurfuryloxyethanol, and dibutylin, may be used advantageously to esterify the dicarboxylic acid.

The dicarboxylic acid may be completely or partially esterified or may have the hydrogen atom of one carboxyl group esterified with an ether alcohol and the other with any other monovalent organic radical. The present invention, therefore, includes the half esters or acid esters, the mixed esters in which the hydrogen atom of at least one carboxyl group is esterified with an ether alcohol, and the neutral esters in which the hydrogen atom of each carboxyl group is esterified with an ether alcohol.

The esters of the present invention are all either water-white liquids, or white solids, when in the pure state, although they may be amber colored when impurities are present. They are practically insoluble in water but are readily soluble in the ordinary lacquer solvents, such as alcohols, ketones, esters and hydrocarbons. They are compatible in equal proportions with nitrocellulose and in somewhat lower proportions with other cellulose esters and cellulose ethers. Films containing cellulose derivative compositions containing the neutral esters coming within the scope of the present invention are extremely tough and flexible and have excellent water resistance. Due to the extremely high boiling point possessed by these esters, they impart substantially permanent flexibility to the films in which they are used.

The esters of the present invention may be used as plasticizers with cellulose derivatives such as cellulose nitrate, cellulose acetate, cellulose propionate, cellulose butyrate, cellulose acetobutyrate, cellulose nitroacetate, and other cellulose esters, ethyl cellulose, benzyl cellulose, and other cellulose ethers, with or without resins such as damar, ester gum, polyhydric alcohol-polybasic acid resins, and the like, oils such as castor, Chinawood, linseed, soya bean, cottonseed oil, and the like, and pigments. Additional plasticizers known to the art such as triacetin, triphenyl phosphate, dibutyl phthalate, camphor, tricresyl phosphate, and the like, and solvents such as alcohols for cellulose nitrate compositions, acetone for cellulose acetate compositions, and toluol-alcohol for cellulose ethers may likewise be used.

The cellulose derivative compositions herein disclosed may be used as lacquers for coating metal, leather, paper, and wood, in dopes for coating fabrics, and in plastic compositions to be used in the preparation of toilet ware, novelties, sheeting, rods, tubes, photographic films, and in similar uses. Cellulose derivative compositions comprising the esters of the present invention are claimed in copending application Serial No. 631,100, filed August 30, 1932.

As many apparent and widely different embodiments of this invention may be made without departing from the spirit and scope thereof, it is to be understood that I do not limit myself to the specific embodiments thereof except as defined in the appended claims.

I claim:

1. An ester of an aliphatic dicarboxylic acid containing from 6-10 carbon atoms, inclusive, wherein the hydrogen atom of at least one carboxyl group is replaced by a group of atoms represented by the formula R—O—R'—, in which R represents the radical of a monohydric alcohol and R' represents a radical from the group consisting of divalent aliphatic hydrocarbon radicals and divalent aliphatic hydrocarbon radicals having an alkoxy group substituted for at least one hydrogen atom thereof.

2. An ester of an aliphatic dicarboxylic acid containing from 6-10 carbon atoms, inclusive, wherein the hydrogen atom of each carboxyl group is replaced by a group of atoms represented by the formula R—O—R'—, in which R represents the radical of a monohydric alcohol and R' represents a radical from the group consisting of divalent aliphatic hydrocarbon radicals and divalent aliphatic hydrocarbon radicals having an alkoxy group substituted for at least one hydrogen atom thereof.

3. An ester of an aliphatic dicarboxylic acid containing from 6-10 carbon atoms, inclusive, wherein the hydrogen atom of at least one carboxyl group is replaced by a group of atoms represented by the formula R—O—CH2CH2—, in which R represents the radical of a monohydric alcohol.

4. An ester of an aliphatic dicarboxylic acid containing from 6-10 carbon atoms, inclusive, wherein the hydrogen atom of each carboxyl group is replaced by a group of atoms represented by the formula R—O—CH2CH2—, in which R represents the radical of a monohydric alcohol.

5. An ester of an aliphatic dicarboxylic acid containing from 6-10 carbon atoms, inclusive, wherein the hydrogen atom of at least one carboxyl group is replaced by a group of atoms represented by the formula R—O—CH2CH2—, in which R represents the radical of a monohydric alcohol, and the hydrogen atom of the remaining carboxyl group is replaced by a monovalent radical derived from an organic hydroxyl compound.

6. An ester of an aliphatic dicarboxylic acid containing from 6-10 carbon atoms, inclusive, wherein the hydrogen atom of at least one carboxyl group is replaced by a group of atoms represented by the formula R—O—CH2CH2—, in which R represents an alkyl radical having from 2-4 carbon atoms, inclusive, and the hydrogen atom of the remaining carboxyl group is replaced by a monovalent radical derived from an organic hydroxyl compound.

7. Di-ethoxyethoxyethyl adipate.
8. Di-butoxyethyl sebacate.
9. Di-butoxyethyl ester of methyl adipic acid.

10. Method of preparing esters which comprises reacting at an elevated temperature a compound from the group consisting of aliphatic dicarboxylic acids containing from 6–10 carbon atoms, inclusive, and esters of said acids, with a monohydric ether alcohol of the type represented by the formula R—O—R'—OH, in which R represents the radical of a monohydric alcohol containing more than one carbon atom and R' represents a radical from the group consisting of divalent aliphatic hydrocarbon radicals and divalent aliphatic hydrocarbon radicals having an alkoxy group substituted for at least one hydrogen atom thereof, said ether alcohol having a higher boiling point than the alcohol formed upon hydrolysis of the dicarboxylic acid ester with which it is to be reacted, and removing the volatile reaction product formed by said reaction from the reaction zone.

11. Method of preparing esters which comprises reacting a dicarboxylic acid from the group consisting of aliphatic dicarboxylic acids containing from 6–10 carbon atoms, inclusive, with a monohydric ether alcohol of the type represented by the formula R—O—CH$_2$CH$_2$OH, in which R represents the radical of a monovalent alcohol containing more than one carbon atom, in the presence of a catalyst and at an elevated temperature, and removing the water formed by said reaction from the reaction zone.

12. Method of preparing esters which comprises reacting a compound from the group consisting of aliphatic dicarboxylic acids containing from 6–10 carbon atoms, inclusive, and esters of said acids, with a monohydric ether alcohol of the type represented by the formula R—O—R'—OH, in which R represents the radical of a monohydric alcohol and R' represents a radical from the group consisting of divalent aliphatic hydrocarbon radicals and divalent aliphatic hydrocarbon radicals having an alkoxy group substituted for at least one hydrogen atom thereof, said ether alcohol having a higher boiling point than the alcohol formed upon hydrolysis of the dicarboxylic acid ester with which it is to be reacted, and removing the volatile reaction product formed by said reaction from the reaction zone.

13. Method of preparing esters which comprises reacting a dicarboxylic acid from the group consisting of aliphatic dicarboxylic acids containing from 6–10 carbon atoms, inclusive, with a monohydric ether alcohol of the type represented by the formula R—O—CH$_2$CH$_2$OH, in which R represents the radical of a monohydric alcohol, in the presence of a catalyst, and removing the water formed by said reaction from the reaction zone.

14. Method of preparing an ester of an acid from the group consisting of adipic, methyl adipic, sebacic, and muconic acids, wherein the hydrogen atom of at least one carboxyl group of the acid has been replaced by a group of atoms represented by the formula R—O—R'—, in which R represents the radical of a monohydric alcohol and R' represents a radical from the group consisting of divalent aliphatic hydrocarbon radicals and divalent aliphatic hydrocarbon radicals having an alkoxy group substituted for at least one hydrogen atom thereof, which comprises reacting a compound from the group consisting of said acids and esters of said acids, with a monohydric ether alcohol of the type represented by the formula R—O—R'—OH, said ether alcohol having a higher boiling point than the alcohol formed by hydrolysis of the dicarboxylic acid ester with which it is to be reacted, and removing the volatile reaction product formed by said reaction from the reaction zone.

15. An ester of adipic acid wherein the hydrogen atom of at least one carboxyl group is replaced by a group of atoms represented by the formula R—O—R'—, in which R represents the radical of a monohydric alcohol and R' represents a radical from the group consisting of divalent aliphatic hydrocarbon radicals and divalent aliphatic hydrocarbon radicals having an alkoxy group substituted for at least one hydrogen atom thereof.

16. An ester of adipic acid wherein the hydrogen atom of each carboxyl group is replaced by a group of atoms represented by the formula R—O—R'—, in which R represents the radical of a monohydric alcohol and R' represents a radical from the group consisting of divalent aliphatic hydrocarbon radicals and divalent aliphatic hydrocarbon radicals having an alkoxy group substituted for at least one hydrogen atom thereof.

17. An ester of adipic acid wherein the hydrogen atom of at least one carboxyl group is replaced by a group of atoms represented by the formula R—O—CH$_2$CH$_2$—, in which R represents the radical of a monohydric alcohol.

18. An ester of adipic acid wherein the hydrogen atom of each carboxyl group is replaced by a group of atoms represented by the formula R—O—CH$_2$CH$_2$—, in which R represents the radical of a monohydric alcohol.

19. An ester of sebacic acid wherein the hydrogen atom of at least one carboxyl group is replaced by a group of atoms represented by the formula R—O—R'—, in which R represents the radical of a monohydric alcohol and R' represents a radical from the group consisting of divalent aliphatic hydrocarbon radicals and divalent aliphatic hydrocarbon radicals having an alkoxy group substituted for at least one hydrogen atom thereof.

20. An ester of sebacic acid wherein the hydrogen atom of each carboxyl group is replaced by a group of atoms represented by the formula R—O—R'—, in which R represents the radical of a monohydric alcohol and R' represents a radical from the group consisting of divalent aliphatic hydrocarbon radicals and divalent aliphatic hydrocarbon radicals having an alkoxy group substituted for at least one hydrogen atom thereof.

21. An ester of sebacic acid wherein the hydrogen atom of at least one carboxyl group is replaced by a group of atoms represented by the formula R—O—CH$_2$CH$_2$—, in which R represents the radical of a monohydric alcohol.

22. An ester of sebacic acid wherein the hydrogen atom of each carboxyl group is replaced by a group of atoms represented by the formula R—O—CH$_2$CH$_2$—, in which R represents the radical of a monohydric alcohol.

23. An ester of methyl adipic acid wherein the hydrogen atom of at least one carboxyl group is replaced by a group of atoms represented by the formula R—O—R'—, in which R represents the radical of a monohydric alcohol and R' represents a radical from the group consisting of divalent aliphatic hydrocarbon radicals and divalent aliphatic hydrocarbon radicals having an alkoxy group substituted for at least one hydrogen atom thereof.

24. An ester of methyl adipic acid wherein the hydrogen atom of each carboxyl group is replaced by a group of atoms represented by the formula R—O—R'—, in which R represents the radical of a monohydric alcohol and R' represents a radical from the group consisting of divalent aliphatic hydrocarbon radicals and divalent aliphatic hydrocarbon radicals having an alkoxy group substituted for at least one hydrogen atom thereof.

25. An ester of methyl adipic acid wherein the hydrogen atom of at least one carboxyl group is replaced by a group of atoms represented by the formula R—O—$CH_2CH_2$—, in which R represents the radical of a monohydric alcohol.

26. An ester of methyl adipic acid wherein the hydrogen atom of each carboxyl group is replaced by a group of atoms represented by the formula R—O—$CH_2CH_2$—, in which R represents the radical of a monohydric alcohol.

EMMETTE F. IZARD.

CERTIFICATE OF CORRECTION.

Patent No. 1,991,391. February 19, 1935.

EMMETTE F. IZARD.

It is hereby certified that error appears in the printed specification of the above numbered patent requiring correction as follows: Page 2, first column, for "adiphatic" read aliphatic; and line 45, for "while" read white; and page 3, first column, line 29, claim 11, for "monovalent" read monohydric; and that the said Letters Patent should be read with these corrections therein that the same may conform to the record of the case in the Patent Office.

Signed and sealed this 21st day of May, A. D. 1935.

(Seal)

Leslie Frazer
Acting Commissioner of Patents.